(12) United States Patent
Rokhvarger et al.

(10) Patent No.: US 8,197,565 B2
(45) Date of Patent: Jun. 12, 2012

(54) SYSTEM OF THE CHEMICAL ENGINEERING PROCESSES GENERATING ENERGY AND UTILIZING MUNICIPAL SOLID WASTE OR A CARBON CONTENT MATERIAL MIXTURE

(76) Inventors: Anatoliy Rokhvarger, Brooklyn, NY (US); Vladimir Boyko, Brooklyn, NY (US)

( * ) Notice: Subject to any disclaimer, the term of this patent is extended or adjusted under 35 U.S.C. 154(b) by 976 days.

(21) Appl. No.: 12/059,430

(22) Filed: Mar. 31, 2008

(65) Prior Publication Data
US 2009/0241420 A1    Oct. 1, 2009

(51) Int. Cl.
*B01J 7/00*      (2006.01)
*C01B 3/36*      (2006.01)
*C01B 6/24*      (2006.01)
*C01B 3/02*      (2006.01)
*C10K 3/06*      (2006.01)
*C10J 3/00*      (2006.01)

(52) U.S. Cl. .............. 48/197 R; 48/61; 48/202; 48/210; 423/644; 423/648.1

(58) Field of Classification Search .............. 48/197 R, 48/61, 202, 210; 423/644
See application file for complete search history.

(56) References Cited

U.S. PATENT DOCUMENTS

| | | | |
|---|---|---|---|
| 2002/0113228 A1* | 8/2002 | Kim et al. | 252/373 |
| 2005/0032920 A1* | 2/2005 | Norbeck et al. | 518/704 |

* cited by examiner

*Primary Examiner* — Matthew Merkling
(74) *Attorney, Agent, or Firm* — Anna Vishev, Esq.

(57) ABSTRACT

A system of the interrelated chemical engineering processes that continuously and simultaneously gasify and utilize of an organic-inorganic raw material or municipal solid waste (MSW) and completely or entirely decompose and transform said raw material, synthesize synthetic gas (syngas) and water steam gas mixture, and melt inorganic materials that are made further treatment and correspondingly processed into following consumable and fully marketable materials or products: syngas fuel, electricity, methanol or gasoline, chemical materials, glassy slag and concrete/road filling materials, multimetal alloy and cast metal goods, greenhouse made green mass, and hot water; said system of chemical engineering processes does not need or use fossil fuel and electric power supplied from external sources; and said system of processes excludes an emission of nitrogen oxide, carcinogenic, and hazardous gases, and air pollutant particles, excludes production of ash or secondhand waste, and makes unsubstantial a carbon dioxide emission.

14 Claims, 2 Drawing Sheets

Figure 1

SYSTEM OF THE CHEMICAL ENGINEERING PROCESSES GENERATING ENERGY AND UTILIZING MUNICIPAL SOLID WASTE OR A CARBON CONTENT MATERIAL MIXTURE

FIELD OF THE INVENTION

We invented a system of interrelated and mutually coordinated chemical engineering processes that continuously and simultaneously provide thermo-chemical gasification, energy generation, and clean utilization of municipal solid waste (MSW) or an organic-inorganic material mixture.

BACKGROUND OF THE INVENTION

There are two urgent global problems. The first one is worldwide energy consumption, which is projected to double by 2037 when fossil fuel resources would be much lower. Burning fossil fuel and incineration of municipal solid wastes (MSW) result in global air pollution and warming due to increased emissions of $CO_2$ from the 300 giga-tons released into the atmosphere today increasing to about 8,000 giga-tons by 2030. Therefore, to sustain the living standards of the U.S. and global population, the total renewable and clean energy sources must be able to meet at least 50% of our energy needs.

The second urgent problem is utilization of MSW. Expensive incineration of, for example, New York City's MSW consumes tremendous amounts of fossil fuel and electric energy and results in: 1) ~25,000 ton/day of air polluting gases comprised of carbon dioxide, $CO_2$ and other hazardous gases that are cleaned by very expensive filter systems consuming an enormous amount of electricity;
2) consumption of fossil fuel to combust municipal waste; and
3) secondhand wastes, such as variable ash compositions with the unavoidable 20% of carbon inclusions that result in flammability of large-size ash dumps and hazardous and heavy metal residual inclusions. All of these prevent utilization of ashes in building materials. Municipal waste incinerators now in use consume a lot of fossil fuel and electric power and result in air pollution and require ash-dump repository land filling for the non-recycled parts of wastes. The incineration technique is also accompanied by the use of expensive sorting and only partial reuse of plastic, glass, paper and metal wastes while such sorting and reuse treatment significantly increases customer and municipal expenses for municipal waste disposal.

The gasification and incineration technique has a long history starting in 1842 with the Baltimore Electric Town Gas Company and the USPTO issued the 'Lurgi' gasification patent in 1887. Since 1910 a lot of gasification plants are working worldwide producing hydrogen and other gas content fuel from coal or shiest or tar or agricultural products or waste. Meanwhile all previously developed gasification processes of carbon content mixtures have relatively low energy power and gasification efficiencies, which results in low productivity of the industrial plants and incompatible high cost of the gas fuel or electric energy that is produced. Additional problems are air pollution and ash dumping. For example, there is Andco-torrex waste incineration-type technology of the Andco and Carborrundum companies.

There are hundreds of patented inventions related to gasification of coal and/or tar and other viscous/solid materials or the oil rectification. These methods (for example, U.S. Pat. No. 6,729,395, U.S. Pat. No. 6,187,465, U.S. Pat. No. 6,485, 232, U.S. Pat. No. 4,309,195, U.S. Pat. No. 4,035,281, U.S. Pat. No. 4,306,506, WO/2001/021735, WO/2001/081723 and WO/2007/081296) burn or gasify carbon content raw materials or MSW at temperatures in the range 1000° C.-2100° C. There are 'flaming processes' that associated with significant heat losses and air pollution. All known coal and MSW 'gasification' methods are also associated with relatively low energy and thermal efficiencies.

Additionally, all these methods have two disadvantages:
a) significant fluctuations of the output of gas and chemical content caused by the unpredictable fluctuations of what makes up MSW and
b) low thermal capability of the produced output gas.

These disadvantages and low energy efficiency make all updraft, downdraft, fluidized bed, and IGCC gasification systems unsuitable for direct application of gas turbines producing electric energy. The next disadvantage of all the above mentioned gasification methods is a significant percentage in output of gas—carbon dioxide and toxic nitrogen oxides, chlorine, sulfur, and fluorine gases.

The patented 'plasma arc' technique requires huge capital expenses, consumes more electrical energy than can produce, and requires regular interruptions to change refractory bricks and electrodes.

The existing plasma-arc technique (PAT) provides gasification of MSW and results in organic energy renewing and partial utilization of the inorganic parts of MSW. However, the PAT unit generates less electrical energy than it consumes. These make both the capital and operating cost of the PAT unit higher than those of an incinerator.

The efficiency of the energy generation is now varying widely with the technology used. The operation of a coal fired energy generation plant is such that only about 30%-35% of the energy in the coal ends up as electricity on the other end of the generators plus the plant produces ash waste to be dumped and air pollutions.

The coal treatment technique, known as integrated gasification combined cycle or IGCC still produce the same amounts of non-usable ash waste and air pollution as other coal energy plants or MSW incinerators. The integrated gasification combined cycle (IGCC) method still produces the same amounts of non-usable ash waste and air pollution as other coal energy plants or MSW incinerators. The state-of-the-art IGCC technique provides coal gasification with energy efficiency of about 60%. Additionally and important, both IGCC and PAT techniques are not profitable treating MSW and therefore need continuous municipal financial support.

Electric energy transmission and distribution (T&D) systems include "reliability must-run" (RMR) electricity generation stations or RMR units. These units are the old and inefficient stations that burn an expensive fossil gas fuel generating a lot of carbon emission and producing ash, if they use coal.

SUMMARY OF THE INVENTION

We invented a system of the interrelated and mutually coordinated chemical engineering processes that continuously and simultaneously provide entire gasification of the carbon elements contenting in an organic material part and clean or full utilization of the inorganic material part of urban or municipal solid waste (MSW) or a carbon content raw material/product or an organic-inorganic solid or viscous or liquid material mixture; said gasification processes facilitate self-generation of all electric and thermal energy needed for continuous and simultaneous operation of the said system of the processes, which does not use external fuel and electric power sources; said gasification processes facilitate generation of the substantial amount of electric energy supply to external or outsides consumers or customers; said utilization processes facilitate thermo-chemical decomposition of the inorganic materials and melting and transformation their elements into either multi-component glassy slag or multi-metal alloy that both after hardening become hygienically inert and useful materials; said system of the processes does not facilitate an emission to outside atmosphere of hazardous or carcinogenic or carbon dioxide or nitrogen oxide gases or dust or smoke or soot or air pollutants; said system of the processes does not produce ash or secondhand solid or viscous or liquid waste; and the system of the processes makes a substantial area of the urban zone waste-free, self-reliant for electricity and thermal energy, and eco-friendly.

Operation of the system of the processes results in continuous production of synthetic gas (syngas), which has a stable and substantially high thermal capability. The continuous operation of the system of the processes will result in supplying customers with inexpensive electric energy, metal alloy casting goods and building and road/pavement materials and additives to be used in concrete. The system of the processes gasifies into syngas more than 92% carbon element mass of the organic content raw materials and utilizes more than 83% energy of the produced syngas, converting syngas potential energy into thermal energy and electric power.

The system of the processes annually utilizes 95,000 tn-105,000 tn of MSW and supplies external consumers or customers of electric power in an amount of 4,600-4,900 kW per one hour or 40,300,000-42,900,000 kW per calendar year.

The Major Advantages of the Invention

The major advantage of the system of the processes is clean and eco-benign utilization of municipal solid waste. There are also seven important and profitable services, as follows:
(i) reduction or elimination of expenses for waste sorting and transportation;
(ii) independent supply to nearest residents and local companies of electrical energy, gas or liquid fuel and hot water;
(iii) creation of at least 40 new local jobs;
(iv) production of inexpensive green mass for local sale;
(v) supply of other metal goods and building/pavement filling materials;
(vi) supply to companies of other chemical products taken from the chemical separator;
(vii) shorter transportation of waste itself saves fuel and reduces air pollution from the trucks, trains or barges used for this purpose.

The system of the processes can also be used for:
a) utilization and liquidation of solid waste dump repositories;
b) conversion of coil or tar or asphalt or schist or peat into gas fuel; or
c) eco-benign liquidation of carbon content chemical and bio-hazardous material dumps.

The system of the processes can increase reliability of the existing electric energy transmission and distribution or T&D systems playing a role of "reliability must-run" or RMR electricity generation stations. The invented system of the processes (ISP) unit can be placed within an urban area to maintain voltage level in T&D and to eliminate air pollution and ash production and disposal.

As ISP unit becomes profitable, it will liberate municipal budgets from significant expenses. The high level of profit will allow self-financing and fast propagation of the ISP units in different town and city areas to support municipal budgets, protect the local and global environment, and improve the standard of living of the local community. Our invented ISP provides energy generation and clean utilization of municipal solid waste (MSW), carbon element content or organic-inorganic mixture works in a manner resulting in no air pollution, no use of external electricity or fuel after start-up and no resulting in ash that require a landfill.

If the cost of collection, transportation, and disposal of municipal solid waste/garbage is partly or in whole paid by the town or city government, ISP clean utilization technology will provide both a saving of taxpayer money and tremendous profits of the owners of the ISP unit.

The ISP does not use outside sources of fossil fuel and electric energy and does not provide air pollution or produce ash or secondhand waste, making a substantial area of the urban zone waste-free, self-reliant for electricity and thermal energy, and eco-friendly. ISP, can be located close to the neighborhood utilizing the waste and reduce the cost and pollution from waste transportation.

Another advantage is the production of useful products such as syngas, metal alloy for use in production of metal goods, slag that can be milled for use as filler in concrete or road maintenance work and green mass. These products can be sold to local residents.

Figure 1:
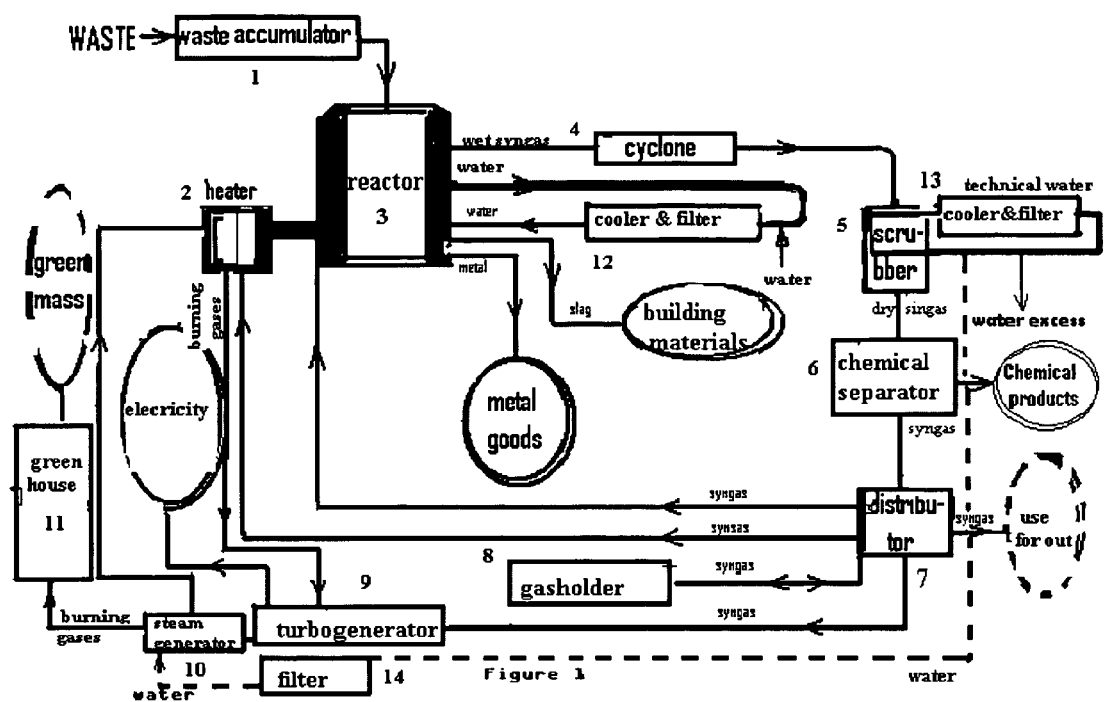
FIG. 1. A conceptual scheme of the invented system of interrelated, linked, and mutually coordinated chemical engineering processes providing the energy generation and clean utilization of municipal solid waste (MSW).

1. —MSW accumulation and loading to a sluice chamber from outside garbage collector by mechanical transporter-conveyer. Certain portions of MSW are passed and loaded to thermo-chemical reactor (3).

2. —Heating-recuperating aggregate (subsystem) has three main input holes and two output holes.
  A. Input holes are used for blowing in:
   1) steam coming from steam generator (10);
   2) syngas for burning purposes, coming from syngas distributor apparatus (7), and
   3) syngas reactant to support thermo-chemical processes in reactor (3), coming from syngas distributor apparatus (7).
  B. Output holes are used for removing:
   1) burning gases coming to the turbo-generator (9) and
   2) overheated steam and syngas mixture coming to reactor (3).

3. —Thermo-chemical reactor with the following three main types of input and output holes:
  A. Three input loading ways:
   1) for MSW from a waste accumulator (1);
   2) an entrance (tube end) for blowing an overheated steam and syngas mixture;
   3) an entrance for returned back tar and other solid or viscous particles collected from filters, scrubber and other cleaning systems.
  B. A pair of input and output holes for circulation of cooling water in the reactor casing sheath;
  C. Three output holes for the following purposes in order to:
   1) blow out a mixture of syngas, water steam, and accompanying gas mixture;
   2) pour out melted slag to produce concrete components and additives; and
   3) pour out melted metal alloy to produce casting goods.

4. —Cyclone cleans syngas of solid particles.

5. —Scrubber separates syngas and water steam making syngas cleaner.

6. —Chemical separator of chemical gas components accompanying syngas flux to produce useful chemical materials.

7. —Syngas distributor, which automatically and/or manually distributes synthetic gas (syngas) to five fluxes consequently for five purposes in order to direct syngas to:
   1) ISP reactor (3), as the major chemical agent;
   2) Heating-recuperating aggregate (2) for burning in one or a few aggregate chambers;
   3) Gasholder (8) for syngas reservation;
   4) Electrical turbo-generator for energy conversion;
   5) Outside customers, converting syngas into methanol or gasoline fuel.

8. —Gasholder, which collects a reserve of syngas.

9. —Electrical turbo-generator, which performs the four major functions:
   1) receives syngas from distributor (7),
   2) produces electric energy,
   3) sends burning gases to the steam generator (10), and
   4) compress air and syngas to obtain syngas delivery to other apparatuses.

10. —Steam generator produces water steam, reusing water, coming from the apparatuses (13) and (14), utilizings high temperature burning gases coming from the turbo-generator (9).

11. —Multi-floor greenhouse, which produces green mass products.

12. —Water cooler and filter within the cycle of the water flux, which cools and filters water circulating around heating-recuperating aggregate (2) and thermo-chemical reactor (3) surfaces.

13. —Water cooler and filter working within the cycle of the water flux, which results from chemical and evaporation processes in reactor (3) and following separation, filtration, and condensation of water steam in apparatuses (4) and (5). The pumped out condensed water steam or water flux is divided into three parts:
   1) After filter (14) a part of the water is reused in the steam generator (10),
   2) The rest of the water is pumped to the greenhouse (11) and/or outside customers,
   3) The excess of the almost clean water is poured into canalization system.

14. —Water filter, which cleans water coming from apparatus (13) to steam generator (10).

Figure 2:
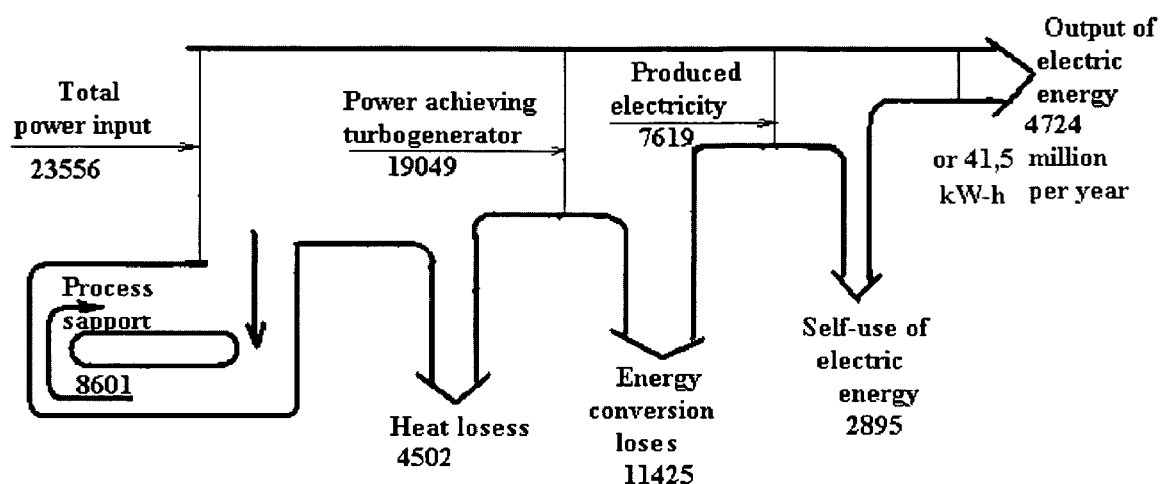

FIG. 2. An example of the energy balance scheme defining energy efficiency of the invented ISP providing complete energy recovery and reuse of the MSW.

Notice: The calculations in FIG. 2 are based on gasification and utilization of ~100,000 tn/year or ~275 tn/day of MSW and the MSW itself is comprised of ~35% wetness, ~23% inorganic materials and has a potential thermal capacity of ~1780 kcal/kg.

DESCRIPTION OF THE PREFERRED EMBODIMENTS

Description of the Invented System of the Chemical Engineering Processes

The invented system of the chemical engineering processes does not use external fuel or fossil fuel as a raw material additive and external electric energy. A part of said processes are occurring inside one thermo-chemical reactor at maximum temperatures of 1750° C.-1850° C. and without flame in an air-oxygen-free or reducing atmosphere. Said processes in said reactor are facilitated by chemical and heating gas reagents that are prepared within said reactor and then after multi-step filtration and separation are partly returned back in the same reactor, which is an innovative circle. These reagents are water steam at 1750° C.-2050° C. temperature and said synthetic gas or syngas.

Said syngas is initially produced as a result of said thermo-chemical processes and partly returned back. Said water steam and syngas mixture are blown in the reactor bottom area and moved within said reactor from the bottom area to its top against gravity movement of said MSW or carbon content or organic-inorganic material mixture.

The invented a system of the processes provides electric energy generation and clean utilization of unsorted urban or municipal solid waste (MSW) with potential thermal capability more than 1100 kcal/kg and this system is working usually in the range of 1500 kcal/kg-1900 kcal/kg on one kg of MSW or carbon content or organic-inorganic material mixture.

Within the thermo-chemical reactor take place thermo-chemical processes that occur in an air-nitrogen-oxygen-free atmosphere, with the presence, support and participation of separately prepared and overheated 280 kg-340 kg water steam and 160 kg-210 kg for each 1000 kg of said utilized MSW. Water steam is blown in the reactor at 1750° C.-2050° C. temperature, 5 atm-10 atm pressure, and together with synthetic gas or syngas, which is initially produced in said reactor and partly returned back to said reactor in an amount defined as 170 kg-210 kg on each 1000 kg of said utilized MSW.

One ISP industrial unit can efficiently treat MSW or carbon content mixtures in the range of 90,000 tn-500,000 tn annually. The major focus of this invention is MSW with two important characteristics of the MSW composition:
   a) a wetness and/or hydroscopic water—20%-50%. If waste wetness is >75%, it is liquid municipal waste, such as sludge. After drying in the same TCM system, this sort of waste also can be treated by the same ISP; and
   b) carbon content—20%-50%, which provides power capability of MSW in the range of 1500 kcal/kg-5000 kcal/kg-waste;
   c) carbon content—15%-100%, when >80% can be related to agricultural waste.

An example of the ISP apparatus composition is shown on FIG. 1 scheme. This scheme has 14 innovatively linked apparatuses and engineering subsystems and a number of flux way tubes (links) and cycles for water, water steam, syngas and exhaust of burned gases. All of them result in an innovative composition of the innovatively provided thermo-chemical and chemical engineering processes that are the major part of the ISP. A part of thermo-chemical processes of the created ISP occurs in a vertical thermo-chemical reactor.

The ISP transforms collected in bunker (1) MSW or other carbon content organic-inorganic mixtures or agricultural products or sorted or unsorted waste or tar or coal or schist or turf or sludge. These raw materials can be transformed and utilized into three major types of useful products: electric energy from syngas fuel, metal alloys, and a glassy slag. The ISP also produces chemical and green mass products. The ISP additionally produces and uses overheated steam and partly returned back syngas. The ISP also makes possible the sale to external customers of the major parts of both syngas and hot water.

The complete regeneration of energy and inorganic components is provided in a vertical thermo-chemical reactor (3). Depending on the annual production capacity desired and carbon and water content in the raw material used, reactor (3)

is 18 m-25 m in height (excluding heights of the top-loading and sluice chambers). The reactor has cylinder-cone-form and an inner diameter of the top entrance of 0.75 m-2.5 m and an average inner diameter (excluding the outer enclosure of the reactor (3) and a water cooling sheath thickness) of 2.0 m-5.0 m.

All thermo-chemical processes occurring in the reactor (3) are accomplished by internally generated energy, which is brought to reactor (3) by a mixture of syngas and the overheated water steam prepared in the heating-recuperating system (2). The volume or pressure of the steam has to be controlled in order to be equal to the energy amount needed to dry, heat, decompose, gasify, transform, and melt the amount and type of MSW or carbon content material mixture being processed. There are also no burning or flammable processes.

The thermo-chemical processes receive all needed energy from the water steam and syngas, and water steam is heated in said heating-recuperating system (2). From the top to the bottom of the reactor (3) the thermo-chemical treatment of MSW or carbon content material mixture occurs in four overlapping zones. The first zone can be characterized as the heating and drying zone, the second zone provides the thermal decomposition and gasification of organic materials, the third zone provides the gasification by overheated water steam of the pyro-carbon material coming from the second zone, and the fourth zone is comprised of two melting layers of: multi-component silicate glass or glassy slag, which floats on the much heavier multi-metal alloy melted layer.

It should be noted that ISP technology solves the problem of asbestos, heavy metals and chemical- and bio-hazardous poisoning components of MSW. Indeed, organic, asbestos and all chemical and bio-hazardous materials and products are decomposed within the second and third zones of the reactor (3).

Some hazardous and heavy metals, including chromium and mercury are partly dissolved and vitrified in multi-component glassy slag and partly dissolved and transformed into multi-metal alloy. Both glassy slag and metal alloy are not hazardous and therefore can be correspondingly used for building and road/pavement material additives and for cast metal goods.

The syngas produced in the reactor (3) and water steam and syngas mixture (wet syngas) goes out of reactor (3) through a hole, which is posed at lower level of the loaded MSW or organic-inorganic material mixture. Due to this, said material mixture partly filters exhausted gases of dust particles. The thermo-chemical processes within said reactor do not use air and flammable processes and result in a mixture of water steam and syngas that have 130° C.-180° C. and do not content nitrogen ballast.

Produced water steam and syngas mixture (wet syngas) goes out of said reactor through a hole, which is at the lower level of MSW or organic-inorganic material mixture loaded through the top of the thermo-chemical reactor and still not decomposed. This allows substantially decrease an amount of tar or mineral particles flying within water steam and syngas emission mixture.

The syngas produced in the reactor (3) and water steam and syngas mixture (wet syngas) goes out of reactor (3) through the cyclone (4), scrubber (5) and chemical separator (6) where the water steam and syngas mixture is separated, cooled, and cleaned. Then the clean syngas goes to the gas distributor (7) and is distributed through five fluxes.

The syngas from the first flux is burned in the heating/recuperating aggregate (2) to heat the water steam to 1750° C.-2050° C., which also heats the separately delivered syngas which is blown in the same reactor (3) the syngas from the second flux. Both overheated water steam and the second flux syngas are working as heating agents and reactants. The syngas from the third flux is used for collection and storage of a certain syngas volume in a gasholder (8) to reserve syngas for the plant start-up or to compensate for low organic content in certain portions of the waste, which composition can fluctuate.

The syngas from the fourth flux is burned to rotate a turbine in a turbo-generator (9), which produces electric energy. The ISP uses a number of fans and gas ventilators, water pumps, electric filters, a scrubber, loading, control and security mechanisms, and a lighting system. All of these consume a part of the electric energy produced by the same turbo-generator (9).

Depending on average thermal energy capability of the treated MSW or carbon content material mixture and designed productivity of the ISP, 33%-75% of the produced electricity can be sold external customers while the rest of the electricity is used to provide operation of the ISP.

The ISP has a fifth flux for syngas, which can be directed out of the same distributor apparatus (7) and transformed into methanol or gasoline to be used as a fuel for cars and other purposes.

Burning gases are produced in the heating-recuperating system (2) and power the turbo-generator (9). In the same turbo-generator (9) there is burning and working the above mentioned syngas from the fourth flux, which is coming from the distributor (7). Water is delivered from cooler (13) to steam generator (14). All burning gases coming from the turbo-generator (9) boil water and heat steam up to 300-400° C. in the steam generator (10). After the steam generator the produced steam goes to the recuperating heater (2). Thus, all burning gases that are mostly comprised of carbon dioxide and nitrogen go through a steam generator (10) and then to the greenhouse (11) where these gases support production of the consumable green-mass.

The heating-recuperating apparatus (2) has two—six chambers that work sequentially. Each chamber has heating elements, for example, small refractory ceramic bolls that are heated within 3-10 minutes by the burned syngas flame produced by the above mentioned syngas from the first flux. After this, hot burning gases go to the turbo-generator (9) and rotate it together with another portion of the burning syngas coming from the distributor (7).

Water steam from steam produced in generator (10) comes into the heated chamber of the heating-recuperating apparatus (2). Heating elements only require a few minutes to transfer their heat to water steam overheating it up to 2050° C. Then, overheated steam is mixed with the above mentioned syngas from the second flux and this gas mixture is blown to reactor (3). This blowing gas mixture provides 5 atm-10 atm pressure and a temperature of 1750° C.-1850° C. at the entrance point of the reactor (a gas mixture input point), which is near the top of the glassy slag melted layer of the reactor (3). The described process is repeated in the next chamber of the heating-recuperating apparatus (2), and this apparatus can have two or more chambers.

Process quality control or productivity optimization of the ISP is provided varying pressure or volume of the blown in said reactor water steam in the range of 5 atm-10 atm. Production capacity of the ISP-unit and its reactor can be increased, for example, by two times when gas pressure is raised from 5 atm to 10 atm. It means that by raising gas pressure we can increase production capacity, for example from 100,000 tn/year to 200,000 tn/year, if the used apparatuses and reactor are designed for maximum achievable production capacity.

Water content of MSW or a carbon content material mixture is evaporated in reactor (3). This steam is joined with another portion of steam, which is blown in the same reactor (3). The total amount of steam goes together with syngas consequently into a cyclone (4), a scrubber (5), and a cooler and filter (13). All condensed water is cleaned of inorganic and tar micro-particles and 52%-60% of this water is further cleaned in the filter apparatus (14) and comes to the steam generator (10) in order to feed the heating-recuperation system and consequently supports the thermo-chemical processes of reactor (3).

An excess of hot water is directed to greenhouse (11) and heats the ISP-unit-plant and buildings and surrounding district houses and businesses during winter or it can be poured off into a canalization system in summer-time. It shall be noted that the invented ISP reuses 85%-95% of technical water, which significantly increases the energy efficiency of the ISP-unit.

There are three cooler and filter apparatuses (12), (13), and (14). Apparatus (12) serves the reactor (3) and heater (2). It is cooling systems where water is continuously circulated using certain pumps. Another water cycle is working to clean exhausted syngas in scrubber (5). This 'scrubber' water is cooled and filtrated in an apparatus (13).

3%-5% of the taken from said reactor dry gas mixture is comprised of a methane, ethylene, chlorine, sulfur, and fluorine gas mixture, which is separated and extracted in a multi-step catalytic and membrane chemical separator (6) and additional apparatuses that are not shown on FIG. 1. These gases are transformed into useful and consumable chemical products. From each 1000 kg of MSW the ISP-unit produces 6 kg-12 kg of useful chemical materials and products. Finally exhaust gas volume is insignificant and this gas is environmentally clean.

From the bottom of the reactor (3) the melted metal alloy is moved to casting forms to be either sent out for additional metallurgical treatment and separation or the melted alloy is cast onsite and formed into consumable goods, such as surface road lids and grids for other canalization systems or fences.

Above the melted metal output of the reactor (3) is an output hole for multi-component glassy melted slag, which does not have carbon inclusions, such as is found in ashes after incineration. Therefore, hardened glass is ground and milled for lump and powder additives used in building and road/pavement concrete.

It has to be noted that industrial use of these products does not result in "second hand" waste, air pollution or hygienic hazards, which makes the work of each ISP-unit eco-benign. Technological operation of the ISP-unit uses its own water resources and electrical energy and does not consume outside water, electric or thermal power or fossil fuel. Without the use of outside fossil fuel and water, the ISP-unit can continuously treat and utilize MSW and other carbon content organic-inorganic mixtures. The ISP-unit renews energy, producing a synthetic gas (syngas) within the ISP-unit and its reactor (3).

The thermo-chemical transformation occurred using the returned syngas and water steam mixture which is overheated to 1750° C.-2050° C. These provide within the reactor (3) an 'oxygen starvation' or reducing atmosphere (lack of oxygen content and without flame) thermo-chemical processes that results in complete chemical decomposition of all loaded organic content materials and melting of all mineral and metal ingredients. It occurs in the major reaction zone of the thermo-chemical reactor at 1600° C.-1850° C. All of these result in complete thermal decomposition of organics and inorganic waste ingredients, including hazards.

ISP also comprise of a return to the said reactor of solid mineral particles or carbon content particles or tar or dust particles precipitated during syngas and steam cleaning and filtration processes and said particles are added to the mass of the loading raw materials.

Gasification processes occurring in said reactor result in an emitted gas mixture, which substantially comprises of syngas and water steam and do not result in carbon dioxide and nitrogen ballast gases; and said emitting gas mixture is taken within a top zone of the reactor and gone out at a temperature of 130° C.-180° C., which facilitates a decrease of the amount of the condensed tar and mineral impurity particles in the produced and consequently cooled syngas and steam mixture to make easier or simplify following filtration and separation processes of said gas mixture To thermo-chemically treat each 1000 kg of MSW, we blow into reactor (3) a gas mixture comprised of 150 kg-250 kg of returned syngas and 280 kg-400 kg of the overheated water steam. There are no burning or flammable reactions within the reactor (3). Thus, the excess water steam and syngas mixture at 1750° C.-1850° C. within reactor (3) are providing equilibrium chemical reactions that decompose all organic ingredients comprising the raw material and transform carbon, oxygen, and hydrogen content materials into a final gas composition of 93%-97% synthetic gas or syngas.

The physical-chemical processing of said 1000 kg MSW or material mixture results in 650 kg-760 kg of dried syngas and 520 kg-620 kg of water steam. The produced, dried and cleaned syngas is divided into four parts and simultaneously used for four different purposes:

1) 25%-29% is blown in the thermo-chemical reactor as the major reactant agent;
2) 26%-31% is pumped into the heating-recuperating subsystem (2) to be burning fuel to heat a mixture of the water steam and the first portion of syngas;
3) 35%-45% is burned in the turbo-generator to produce electric energy used for the needs of the ISP-unit and to supply outside consumers; and
4) an insignificant part of syngas is stored or kept from time to time in gasholder (8) to correct current fluctuations in MSW compositions.

280 kg-360 kg of water steam, which is evaporated from MSW in the reactor (3) is returned to the heating-recuperating system (2) and then going back to the reactor (3)—see FIG. 1. Gasification and clean or full utilization of each 1000 kg of MSW with a potential thermal capability 1600-2000 kcal/kg-waste requires blowing in said reactor 290 kg-350 kg of overheated water steam and 160 kg-220 kg syngas and said organic material gasification processes result in emitted out from said reactor 540 kg-600 kg of water steam and 680 kg-740 kg of dry syngas and said inorganic material utilization processes totally result in 120 kg-200 kg of melted multi-component silicate glass slag and 45 kg-70 kg of multi-metal alloy that are separated on top and bottom melting layers in the bottom part of the reactor (3).

Discharged and hardened silicate glass slag can be ground into lumps or granules or milled into sand that is eco-benign and be used as a filling material or additive for building or road/pavement concrete. The melted alloy is discharged from reactor (3) into casting forms where it is hardened into road lids and grids or fences or other useful goods.

Within said reactor all thermo-chemical processes do not have conditions for production of dioxin or hazardous or carcinogenic gases. Therefore a work of the ISP-unit does not result in an emission of said gases into natural air-atmosphere.

The ISP innovatively combines following components:
1) A system of the innovatively linked and interrelated chemical engineering processes providing energy generation and full utilization of MSW or carbon content solid or viscous or liquid fossil, agricultural or industrial materials or products or a mixture of them;
2) Thermo-chemical transformation of the organic part of MSW or other carbon content mixtures into syngas achieved in the reactor at maximum temperatures 1750° C.-1850° C., and said thermo-chemical transformations are provided without flammable processes in an air-oxygen-free atmosphere, contenting overheated water steam;
3) Entire energy renewal and full utilization of MSW or carbon content mixtures results in complete self-procurement and autonomy (self-reliance) of the ISP by electric power, thermal energy, and technical water;
4) Entire energy renewal and full utilization of MSW or carbon content mixtures results in onsite industrial production (manufacturing) of following six types of useful and salable materials and products:
   a) electric energy or gas fuel;
   b) hygienically inert metal alloy and goods; and
   c) hygienically inert and carbon or ash inclusion-free glassy slag grinding and milling in building or road materials or additives for concrete; d) chemical materials; e) green mass; and f) hot water;
5) Decomposition into elements, dissolution, and vitrification of asbestos, chemical and bio-hazard materials and products and heavy or hazardous metals in a melted glassy multi-component slag or melted multi-component metal alloy;
6) Environmental clean-up of substantial areas of the town or city and there are no air pollution, ash production or ash or waste dumps and no long-distance waste transportation.

Gasification processes occurring in said reactor result in an substantially decreased amount or volume of the emitted gas mixture, which does not content carbon dioxide, nitrogen ballast, and a group of nitrogen oxide gases substantially comprising of syngas and water steam. The emitted gas mixture is taken within a top zone of the reactor and gone out at a temperature of 130° C.-180° C., which facilitates a decrease of the amount of tar and mineral impurity particles in the produced and consequently cooled syngas and steam mixture. These make easier or simplify following filtration and separation processes of said gas mixture.

Thus, the ISP continuously provides energy renewal or organic material gasification processes enabling inorganic material utilization processes comprising of following processes:
1) transformation of silicate-calcium content inorganic materials into melted and carbon-particles-free multi-component glassy slag and extraction of non-metal elements into said slag,
2) recycle and transformation of metal content materials into melted multi-metal alloy,
3) decomposition into elements of asbestos, chemical and bio-hazardous materials and products and deposition of said elements into a melted glassy slag,
4) transformation or vitrification of a light metal or a light hazardous metal or a light metal product into a melted glassy slag or a melted multi-component metal alloy,
5) transformation of a metal or a iron or a heavy metal or a mercury or a hazardous heavy metal or a heavy metal product into a melted multi-component metal alloy,
6) ISP-unit does not use outside or external fossil fuel and produce ash or secondhand solid or viscous or liquid waste,
7) return to the top entrance of said reactor of solid mineral particles and dust coming from syngas and water steam cleaning and filtration subsystems of the ISP,
8) return to the high temperature zone of said reactor of tar and carbon content dust coming from syngas and water steam cleaning and filtration subsystems of the ISP.
9) electric energy supply of external consumers or electric energy transmission and distribution or T&D systems playing a role of "reliability must-run" or local RMR electricity generation stations;
10) transformation of syngas into methanol or gasoline fuel,
11) use of syngas for direct energy generation in thermal elements or electrical generators of autonomous electric energy generation systems,
12) direct use of syngas as gas fuel for diesel or conventional engines of vehicles,
13) extraction from exhausted gases of chlorine, fluorine, and sulfur elements and their transformation into useful chemical raw materials,
14) grinding and milling of multi-component glassy slag to produce useful building and road materials and concrete additives,
15) metal alloy casting to produce useful metal goods,
16) reuse of carbon dioxide gas coming from electric turbo-generator in an affiliated greenhouse, which results in green-mass production and minimization of air pollution,
17) recycling and reuse of water evaporated from said MSW or organic-inorganic material mixture for all technological needs of ISP, which saves natural water,
18) supplying an affiliated greenhouse and nearby homes or buildings or commercial or industrial customers with hot recycled water,
19) extraction from exhaust gases chlorine, fluorine, and sulfur elements and their transformation into useful chemical raw materials.

ISP provides:
1) gasification into synthetic gas or syngas and water steam gas mixture of the organic part of the raw material or MSW mixture,
2) transformation of silicate and calcium content inorganic materials and mostly light elements including hazard elements and materials into melted, vitrified and carbon-particles-free multi-component glassy slag, which is hygienically inert,
3) recycle and transformation of metal and heavy element content materials including hazard metals into hygienically inert multi-metal melted alloy, and
4) ISP does not produce ash or secondhand waste and therefore require no dumping repositories and does not provide an emission into air-atmosphere of dioxin or nitrogen multi-oxides or hazardous or carcinogenic gases; no emission into air-atmosphere of carbon dioxide and nitrogen oxide gases.

The ISP unit needs a relatively small footprint (about three hectares) and its work does not result in any air pollution and no ash so no landfill is required. Therefore the ISP plant can be located within or close to any town or city district, which significantly decreases waste transportation expenses and the associated air pollution and traffic problems.

The ISP can locate within an urban residential or a commercial zone or an industrial or agricultural area generating energy and utilizing all types of unsorted organic-inorganic waste and making a substantial area of said zone waste-free, air-pollution-free and self-reliant for electricity and thermal-energy resulting in the clean and eco-friendly area of said zone.

Energy Renewing and Gasification Processes

To realize the above listened composition of all simultaneously occurring thermo-chemical and chemical engineering processes, one average kilogram of said unsorted urban or municipal solid waste (MSW) or carbon content or organic-inorganic material mixture has the potential energy capability of more than 1100 kcal.

If the ISP treats an organic-inorganic material with a potential energy capability more than 1100 kcal/kg, this ISP can support or facilitate an operation of one additional ISP or a set of the separately located ISP or thermo-chemical or chemical reactors or kilns or furnaces or ovens that treat organic materials or organic-inorganic materials or inorganic materials or ores or schist or minerals that have a potential energy capability less than 100 kcal/kg.

Some well-known energy generation techniques use to use two or more stages that can include burning or enrichment of the produced in incinerator low-calorie gases to boil water and heat water steam. Only after this, produced water steam is used in the steam-turbo-generator to produce electric energy. This is a multi-stage electric energy generation processes.

Thermo-chemical processes in the ISP reactor directly (one-stage process) result in high calorie content syngas, which is directly used in electrical turbo-generator or for chemical engineering conversion into methanol and gasoline fuel. Syngas can be also used for energy generation in thermal elements or electrical generators. Another application of syngas is gas fuel, which is suitable for diesel or conventional engines of vehicles.

Said thermo-chemical processes are accomplished within said reactor without flame and in an air-free or oxygen-free and nitrogen-ballast-free atmosphere with support and participation of water steam and syngas atmosphere, which is determined as a reducing atmosphere.

In the range of about 400° C.-800° C. organic components of MSW are decomposed into carbon and other elements. The gasification reactions are provided in reduction atmosphere, i.e., without oxygen and with excess of water steam. There are organic dissociation and synthesis, including a reaction, which occurs at 1200° C.-1700° C., $C+H_2O \rightarrow CO+H_2$. Most carbon content materials and MSW include oxygen elements. Therefore there also take place additional reactions, such as $C+\frac{1}{2}O_2 \leftrightarrow CO$.

Said system of chemical engineering processes produces dry gas mixture, which on 94%-96% (volume percentage) is synthetic gas (syngas) composing of 47.5%-48.5% hydrogen gas, $H_2$ and 46.5%-47.5% carbon monoxide gas, CO, and said syngas has the potential energy capability of 3600-4000 kcal/kg-syngas.

The unique advantage of the introduced invention is positive energy balance of the ISP. Outside fossil fuel gas, electric energy, and running water sources are used only for one day-long startup period. Meanwhile during full operation, the ISP continuously self-supplies and supplies to the outside customers by commercially significant amounts of electrical energy and hot water.

When the ISP regularly treats 1000 kg MSW or carbon content material mixture or coal, the ISP will produce 600 kg-1500 kg of syngas. MSW can be collected from different town or city districts that have different average carbon organic and water contents and consequently need different amounts/volumes of blowing into reactor (3) with overheated syngas and water steam.

For MSW with potential thermal capability 1600 kcal/kg-2000 kcal/kg, said thermo-chemical processes within said reactor are resulted in syngas production, and syngas is used in following proportions: 27%-31% of the produced syngas is returned back and blown in said thermo-chemical reactor as the reactant; 26%-30% of said syngas is pumped into the heating-recuperating subsystem where it works as a burning fuel to heat water steam; 14%-17% of said syngas is used in the electric turbo-generator to supply electric energy for all ISP; 26%-30% of said syngas is used in the electric turbo-generator to supply electric energy to external users or consumers; and an insignificant part of the produced syngas is kept or stored from times to times in a gasholder to correct current fluctuations in MSW compositions.

Gasifying 1000 kg of MSW or carbon content or organic-inorganic material mixture with potential energy capability 1100 kcal/kg-4800 kcal/kg, said reactor produces 400 kg-1400 kg of syngas and said ISP generates 500 kW-h-2,500 kW-h electric power.

Wetness and chemical composition of MSW can vary in a broad range. If wetness of municipal waste >70%, it may be sewage. Amounts of syngas that are blown in the reactor are corresponds with an amount and characteristics of the loaded MSW.

If ISP unit annually treats 95,000 tn-105,000 tn of MSW with potential thermal capability of 1600 kcal/kg-1800 kcal/kg of MSW fluctuating with the chemical and material compositions, each hour this ISP unit generates syngas in an amount which is equal to 31,000 kW-33,000 kW of potential energy. This power amount is considered as a power input for energy balance calculation on FIG. 2.

The sum of the generated energy includes 8,000 kW-9,200 kW, which could not be counted in further power balance since this potential energy is returned back and circulated in the ISP system as syngas needed to support the thermo-chemical processes in reactor (3) where useful power generated by ISP is in the range 23,000 kW-24,000 kW.

If the ISP annually treats 95,000 tn-105,000 tn of MSW with potential thermal capability of 1600 kcal/kg-1800 kcal/kg, said chemical engineering processes result in syngas energy production, which is divided on three major parts:
1) 13%-15% energy is spent for heating losses;
2) 25%-28% energy facilitates thermo-chemical processes occurred within said reactor; and
3) 59%-61% energy is converted into electric energy, which is divided on two major parts:
   a) 36%-40% said total electric energy is spent for self-use of the ISP and
   b) 60%-64% said total electric energy is delivered to external consumers or customers.

If MSW treatment capacity of the ISP is 95,000 tn-105,000 tn MSW, ISP generates to 23,000-24,000 kW energy per hour and this energy is used for following four purposes:
1) Heat losses are equal to 4200 kW-4800 kW or 18%-20%;
2) Energy losses associated with conversion of the burned syngas into electric energy within a turbo-generator are equal to 11000 kW-11800 kW or 48%-49%;
3) To support continuous work of all apparatuses and systems of the ISP unit, there are used onsite 2700 kW-3100 kW or 11.5%-13.0%;
4) External customers receive 4,600 kW-4,900 kW or 20%-25% of electric energy Syngas can be directly used as a fuel in a diesel engine or a conventional engine or a vehicle or in an autonomous electric energy generator or in a thermal element or further or additional chemical-technological processes can provide direct transformation of said syngas into gasoline or methanol fuel or produce polymer materials or hydrogen.

Thus, 11.5%-13% of the usable electric energy produced by the ISP is consumed by self needs of the ISP for all fans, ventilators, pumps, electric filters, apparatus motors, control and automatic devices, and lighting and computers 24 hours/day. As show by conservative estimation, the ISP annually utilize 95,000 tn-105,000 tn of MSW and generate for external consumers or customers electric energy in an amount of 4,600-4,900 kW per one hour or 40,300,000-42,900,000 kW per calendar year, which is a perfect energy efficiency parameter of the ISP. If a part of syngas is transformed into electric energy in order to only satisfy self-needs of the ISP, the rest of the produced syngas can be transformed into methanol or gasoline fuel. It should be noted that production cost of ISP products obviously does not content MSW cost or fossil fuel cost, which makes wholesale price of the generated electricity or syngas fuel or methanol or gasoline fuel very compatible.

Organic material gasification comprises of following processes:

1) gasifying 1000 kg of MSW or carbon content or organic-inorganic material mixture with potential energy capability 1100 kcal/kg-4800 kcal/kg, said reactor produces 400 kg-1400 kg of syngas, and said ISP generates 500 kW-h-2,500 kW-h electric power,
2) the first part of the produced syngas is used as a burnt fuel overheating water steam in a heating-recuperating subsystem,
3) the second part of the produced syngas is returned back and used in said reactor as a chemical reagent for all thermo-chemical processes providing within said reactor,
4) the third part of the produced syngas is directly converted in electric energy by an electric turbo-generator of the said ISP,
5) blown in said rector overheated water steam and syngas mixture is heated in the heating-recuperating subsystem of the ISP provides all needed energy for all thermo-chemical processes taking place within said reactor,
6) self-generation of all energy needed for continuous and simultaneous operation of the said TCM system excludes a use of external sources of electric power and fossil fuel,
7) said thermo-chemical processes within said reactor occur without flame and in an air- and oxygen free environment of said syngas and said water steam or reducing atmosphere,
8) process quality control or productivity optimization is provided varying pressure or volume of the blown in said reactor water steam in the range of 5 atm-10 atm,
9) the water steam, which is emitted from said reactor, is then condensed and boiled and heated in a steam generator of the said ISP, then overheated in a heating-recuperating subsystem of the said ISP, and then blown in said reactor at 1750° C.-2050° C. temperatures,
10) thermo-chemical processes, taking place within said reactor occur at maximum temperature of 1750° C.-1850° C., There is no emission from said reactor into outside atmosphere of nitrogen ballast gas or dioxin or hazardous or carcinogenic or carbon dioxide or nitrogen oxide gases. ISP regenerates 93%-97% renewable energy of the gasifying raw material or MSW and an efficiency of the use of the generated energy by said system of the chemical engineering processes is 83%-87%. Therefore this invention is an extremely important achievement for energy renewal of organic-inorganic mixtures to solve energy harnessing global problems.

ISP provides syngas combustion for electricity generation and water steam overheating processes. These syngas combustion processes generate dust-free, nitrogen-oxides-free, nitrogen ballast-free, and unpolluted gas emission, comprising of substantially pure carbon dioxide and water steam mixture, which therefore is substantially in whole or almost completely absorbed by a green mass growing in an greenhouse. These result in both green mass production and an substantial elimination of the carbon dioxide emission in an outside atmosphere.

Green mass grows in a vertical and fully mechanized and automatically controlled multi-level greenhouse, which results in both green mass industrial production and practical elimination of the carbon dioxide emission in an open atmosphere.

Meanwhile, working now power units or electricity generation stations, that combust coal or oil or bio-mass or natural gas, emit gas mixtures that are not suitable for direct green-mass growing since they content nitrogen oxides and hazardous gases. Therefore working now combustion systems emit in atmosphere 30-50× more $CO_2$ than ISP does.

EXAMPLES

Example 1

The ISP unit annually utilizes 100,000 tons MSW, which is equal to ~1% of New York City's MSW. The ISP annually uses ~9200 $m^3$ of water to compensate for losses of technical water, plant territory and MSW collector cleaning, and personnel hygienic needs. ~1450 $m^3$ of water daily circulates within the major reactor cooling system and other technological subsystems of the ISP. No outside fuel or electricity is used. This ISP annually produces or facilitates:

(i) Syngas with thermal capacity of 3,600 kcal/kg, which is comprised of hydrogen, $H_2$ (~48%) and carbon monoxide, CO (~47%) are partly returned back for other technological purposes within the ISP. Another part of syngas is used for the rotation of the turbo-generator to produce electrical energy, which is partly used for the same ISP's purposes while the balance can be sold to local customers in an amount of ~41,500,000 kW-hours. Alternatively, a part of the produced syngas can be transformed into methanol and/or gasoline fuel;
(ii) Metal recycling process comprised of extraction and melting of iron and other metal content alloys and cast metal goods from them in the total amount of ~5,600 tons;
(iii) ~16,500 tons of hardened multi-component glass-like slag (without carbon inclusions) which will be ground and/or milled for filling additives in building and road/pavement materials and concrete;
(iv) Green mass produced in a multi-floor greenhouse utilizing carbon dioxide, $CO_2$ and water steam;
(v) ~90 tons of chemical materials separated by the chemical separator.

Example 2

The treated carbon content mixture, for example, coal, has an energy capability of 4800 kcal/kg. This allows production of 1.4 kg of syngas from 1.0 kg of the treated carbon content mixture, if a certain amount of outside water is used and converted with water steam. If such ISP has annual production capacity 100,000 tn, it annually produces for outside customers >100 million kW-h.

Example 3

Thermo-chemical reactor of the ISP annually treats 100,000 tn MSW with the following average characteristics of the treated MSW: a) wetness ~35%; and b) carbon content ~21%; and c) potential thermal capability 1780 kcal/kg-waste. To treat each 1000 kg of MSW, the ISP reactor requires and consumes 320 kg overheated steam and 190 kg heated syngas that is produced by and returned back to the same reactor. Thermo-chemical gasification of 1000 kg of MSW in one reactor of one ISP unit results in 570 kg water steam, 710 kg of dried syngas, and 200 kg of melted slag and metal alloy. As one can calculate, if 320 kg water steam is returned back into the ISP reactor for the next cycle of the thermo-chemical process, 250 kg water steam is directed through other apparatuses to the greenhouse of the ISP and to heat other outside industrial shops and residences or be poured into a canalization system.

Example 4

The following are average characteristics of the treated MSW: a) energy capability 1780 kcal/kg-waste; b) wetness ~35%; and c) carbon content ~21%. Treating 1,000 'average' kilograms of MSW, the ISP produces 650 kg syngas with thermal capability of 3600 kcal/kg. This 650 kg of syngas is divided in the following three major and one additional (fourth) flux:
1) 190 kg of syngas is heated in heating/recuperating aggregate and returned back to the thermo-chemical reactor to support the required thermo-chemical processes;
2) 180 kg of syngas is burned in the heating/recuperating system to overheat the water steam and syngas mixture before they are blown into the thermo-chemical reactor;
3) 280 kg of syngas is burned in the turbo-generator to produce electricity while 36% of the electricity is used for the ISP's needs;
4) additionally, 0.005%-0.01% of the produced syngas is stored in gasholder.

Example 5

Major Technical Characteristics of the Annual Work of One ISP Unit

| # | Technical characteristics | Value |
|---|---|---|
| 1 | Average thermal capacity of the solid wastes for the urban garbage, kcal/kg | 1780 |
| 2 | Minimum time-period of non-stop work (24 h, 7 d/w) without fixtures, years | 15 |
| 3 | Required size of used land in meters | 300 × 100 |
| 4 | Production capacity of the ISP to utilize unsorted MSW, in tons | 100,000 |
| 5 | Energy output: | |
|   | a) Electric energy produced by turbo-generator, (i) total, million kW-h: | 67.0 |
|   | (ii) for outside use, million kW-h: | 41.5 |
|   | b) Instead of electricity, syngas can be converted either in: (i) gasoline, tons | 1,550 |
|   | or (ii) methanol, tons | 3,000 |
| 6 | Production of concrete filling materials for road/pavement construction, tons | 16,500 |
| 7 | Production of alloys for cast of metal goods, incl. sewage lids and grids, tons | 5,600 |

Example 6

Comparison of one ISP working unit and an incinerator technique is provided for the utilization of MSW comprised of ~35% wetness and ~23% inorganic materials and having thermal capacity of ~1780 kcal/kg.

| # | Characteristics | ISP-unit | Incinerator |
|---|---|---|---|
| 1 | Production capacity | 275 t/day (100,000 t/y) | 275 t/day (100,000 t/y) |
| 2 | Maximum temperature of the processing | 1750° C.-1850° C. | 2000° C. |
| 3 | Regime of operation | Continuous | Continuous |
| 4 | Needed land | | |
|   | a) Facility footprint | 3 hectares | 6 hectares |
|   | b) dump repository | None | 0.4 hectare/year |
| 5 | Consumption of outside resources | | |
|   | a) electricity | None | 20 kW-hr/tn-waste |
|   | b) fossil fuel | None | 200 kg/tn-waste |
|   | c) mineral additives | None | Lime |
| 6 | Air pollution, including carbon dioxide | Insignificant | ~150 tn/day |
| 7 | Ash or other secondhand wastes and their transportation to dump repositories | None | ~250 kg/tn-waste Significant expenses |
| 8 | Waste transportation to the unit | Within a district | Long distance |
| 9 | Waste sorting and reuse | None | Significant expenses |
| 10 | Annual production of salable products | | |
|   | a) renewable electrical energy | 67.0 mln kW-h | None |
|   | b) electric power for outside use | 41.5 mln kW-h | None |
|   | c) casting metal goods from alloys | 5,600 tn | None |
|   | d) building materials | 16,500 tn | None |
|   | e) chemical products | 90 tn | None |
|   | f) green mass utilizing $CO_2$ | Variable amount | Possible |
| 11 | Annual operation profit | $10 MM/year-profit | Municipal budget annually pays $ . . . MM |
| 12 | Capital investment $/tn-MSW | ~$270/tn-year | ~$800/tn-year |

It is to be understood that while the invention has been described and illustrated in detail, the above-described embodiments and examples are simply illustrative of the principles of the invention and the forms that the invention can take, and not a definition of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

The invention claimed is:

1. A method for thermo-chemical gasification, utilization, and recycling of a feedstock including a carbon content solid waste or a solid mixture of at least one organic and one inorganic material, the method comprising:
treating said feedstock during its gravity movement from a top section to a bottom section of a vertical column apparatus to facilitate drying, organic material's gasification, and inorganic material's melting processes;
receiving an overheated steam from a steam-heater apparatus into a gasification zone of said vertical column apparatus in which said gasification of organic materials is performed;
applying said overheated steam at a temperature of 1600° C.-1850° C. to said feedstock so as to
  i) produce a synthetic gas (syngas) and convert about 93%-97% of a calorific value of said organic material of said feedstock into a calorific value of said syngas, said caloric value of the syngas being about 3600 kcal/kg-3800 kcal/kg, a part of the produced syngas being burnt in said steam-heater apparatus so as to overheat said steam;
  ii) utilize said inorganic materials by melting all of said inorganic materials of said feedstock and separating said inorganic materials from each other into a liquid multi-component glassy slag and a liquid multi-metal alloy;
separately discharging said liquid multi-component glassy slag and said liquid multi-metal alloy;
evaporating water from said feedstock to produce an evaporated steam in said vertical column apparatus;
cleaning said evaporated steam and then condensing said evaporated steam into a warm water; and
separating said warm water into a first portion, a second portion and a third portion,
  said first portion of said warm water being fed into a steam generator apparatus to be boiled into a recycled steam using heat of exhaust gases coming from an onsite located electro-turbo-generator, said recycled steam feeding into said steam-heater apparatus where said recycled steam is overheated using energy of said burnt syngas and is delivered from said top section of said vertical column apparatus,
  said overheated steam being fed to said gasification zone of said vertical column apparatus providing a steam pressure of about 5 atm-10 atm and a temperature of about 1600° C.-1850° C. inside said vertical column apparatus, and
  an amount of said overheated steam being blown into said vertical column apparatus controlling said gasification, utilization, and recycling processes within said vertical column apparatus,
  said second portion of the said warm water feeding an associated greenhouse facility to facilitate grow of green mass and plants, and
  said third portion of the said warm water being heated by exhaust gases of said steam heater apparatus and delivered to neighboring residences, being thereafter returned to said steam generator or poured out into canalization,
wherein said gasification of said organic materials and said syngas production is performed concurrently with said utilization and recycling of said inorganic materials in the same vertical column apparatus in an atmosphere of said overheated steam and in the absence of air, oxygen, and catalysts.

2. A method for thermo-chemical gasification, utilization, and recycling in accordance with claim 1, further comprising a step of thermo-chemically converting said organic materials of said feedstock in said vertical column apparatus into said syngas comprising about 46.5%-47.5% of carbon monoxide gas, CO and about 47.5%-48.5% of hydrogen gas, $H_2$; and wherein said thermo-chemical converting said organic materials is provided without use of outside fuel.

3. A method for thermo-chemical gasification, utilization, and recycling in accordance with claim 1, wherein said produced syngas with a calorific value of about 3600 kcal/kg-3800 kcal/kg is thereafter utilized as at least one of a) a gas fuel for combustion in an electro-turbo-generator or an engine for electricity generation, b) a gas fuel for supplying a plurality of facilities, c) a gas used for production of polymer materials, and d) a gas used for production of a liquid fuel or a bio-fuel for vehicles.

4. A method for thermo-chemical gasification, utilization, and recycling in accordance with claim 1,
wherein said method facilitates complete, clean, self-reliable thermal energy and self-sustainable gasification, utilization and recycling of various feedstock material mixtures or of municipal solid wastes (MSW) with an average calorific value of more than 1100 kcal/kg, and
wherein said feedstock is constantly and continuously portion-by-portion loaded into said top section of said vertical column apparatus and is processed there.

5. A method for thermo-chemical gasification, utilization, and recycling in accordance with claim 1, wherein said method provides said gasification, utilization, and recycling of a broad spectrum of feedstock materials and wastes with an average calorific value in a range of 1100 kcal/kg-8100 kcal/kg, said feedstock materials and renewable wastes comprising at least one of garden waste, wood and plastic waste, paper and cardboard waste, agricultural waste, food production waste, various biomasses, dried sewage, river silt, used tires, rubber goods, home debris, demolition waste, asbestos-containing construction waste, landfill waste, medical waste, ash from incinerators or coal power plants, carbonaceous schist, lean coal, ordinary coal, carbon-containing industrial waste, oil waste, tar, pitch, asphalt waste, petroleum coke, household, restaurant and commercial waste, and sorted or unsorted municipal solid waste (MSW).

6. A method for thermo-chemical gasification, utilization, and recycling in accordance with claim 1,
wherein processing of said feedstock in said vertical column apparatus is provided at temperatures of about 1600° C.-1850° C., said processing resulting in decomposition, separation, and melting of non-metallic inorganic materials of said feedstock into said multi-component glassy slag, and wherein said discharging of said multi-component glassy slag is performed through a first outlet in said bottom section of said vertical column apparatus, said multi-component glassy slag after being hardened being hygienically inert and free from carbon inclusions, and said hardened slag, after onsite grinding and milling, is being usable as concrete feeler material and for road pavements, wherein said melting of said non-metallic inorganic material is provided without use of outside fuel; and wherein said melting and discharging of said non-metallic material is performed without ash production by said vertical column apparatus.

7. A method for thermo-chemical gasification, utilization, and recycling in accordance with claim 1, wherein said processing of said feedstock in said vertical column apparatus results in decomposition, separation, and melting of metallic inorganic materials of said feedstock into said multi-component alloy, said melted alloy being positioned in said vertical column apparatus under a layer of said liquid multi-component glassy slag, wherein said discharging of said melted alloy from said vertical column apparatus is performed trough a second outlet, which is positioned lower than said first outlet, said melted alloy after being hardened being hygienically inert, free from particle inclusions and usable for a further metallurgical processing, wherein said melting said metallic materials is provided without use of outside fuel; and wherein said melting and discharging of said metallic materials excludes ash production by said vertical column apparatus.

8. A method for thermo-chemical gasification, utilization, and recycling in accordance with claim 1, further comprising the steps of evaporating sulfur, chlorine and other volatile inorganic elements from said feedstock, taking them out at said top section of said vertical column apparatus, then extracting and filtering them from said syngas and steam, and then, using chemical engineering apparatuses, converting them into commercially usable chemical salts.

9. A method for thermo-chemical gasification, utilization, and recycling in accordance with claim 1, wherein said syngas and said steam flow from said gasification zone of the vertical column apparatus to said top section of said vertical column apparatus, wherein, within said top section of said column apparatus, a tar, soot, and dust flying particulates precipitate and are absorbed on loading feedstock lumps to be returned back to said gasification zone, and wherein an outgoing steam and outgoing syngas are free from said tar, soot, and dust particulates and are discharged at said top section of said vertical column apparatus at a temperature of about 130° C.-180° C.

10. A method for thermo-chemical gasification, utilization, and recycling in accordance with claim 1, wherein in the absence of air and oxygen, with an excess of steam, and temperature in said gasification zone of said vertical column apparatus of about 1600° C.-1850° C., said syngas is free from dioxin, furan, and carcinogenic gases, wherein a part of the produced syngas is burnt in said steam heater apparatus and in an electro-turbo-generator apparatus producing a carbon dioxide gas, $CO_2$ emission being free from said dioxin, furan, and carcinogenic gases, wherein, said carbon dioxide emission is utilized in an associated greenhouse facility, and wherein said method results in insignificant GHG emissions.

11. A method for thermo-chemical gasification, utilization, and recycling in accordance with claim 1, wherein an industrial waste-to-energy plant employs said method to gasify, utilize and recycle continuously produced and renewable home and commercial waste, garden waste, demolition waste and home debris waste comprising municipal solid waste (MSW), wherein said feedstock containing said MSW has an average calorific value in a range of about 1700 kcal/kg-4100 kcal/kg, wherein about 80,000-125,000 ton of MSW per calendar year is received for gasification, utilization and recycling, and wherein said gasification of organic part of said MSW feedstock results in production of syngas, and said syngas is supplied to an onsite located electricity generator to be burnt in an electro-turbo-generator or an engine to generate electricity to supply an operation of said plant and an electric grid.

12. A method for thermo-chemical gasification, utilization, and recycling in accordance with claim 11, wherein said waste-to-energy plant is a component of a local electric energy generation, transmission, and distribution (T&D) system, and said plant plays a role of a "reliability must-run" (RMR) electricity generation station.

13. A method of the thermo-chemical gasification, utilization, and recycling in accordance with claim 11, wherein said feedstock containing lean MSW has an average calorific value in a range of about 1750 kcal/kg-1820 kcal/kg, wherein a part of said syngas produced by said waste-to-energy plant is supplied to an electricity generation station to annually generate and supply to an outside electricity grid about 41,000 MW-h-43,000 MW-h of electricity which is about 60%-64% of a total generated power, and wherein the rest of the total generated power is used for operation of said waste-to-energy plant.

14. A method for thermo-chemical gasification, utilization, and recycling in accordance with claim 1, further comprising the steps of:

dividing said produced syngas among four fluxes;

returning a first portion of said produced syngas back to said vertical column apparatus to contribute to thermo-chemical processes within said vertical column apparatus;

utilizing a second portion of said produced syngas as a burning fuel in said steam-heater apparatus to overheat said steam, said steam, after this, being delivered to said vertical column apparatus;

using a third portion of said produced syngas as a product of said system; and storing a remainder of said produced syngas in a gasholder to compensate for possible fluctuations in feedstock compositions or to correct operation modes of said vertical column apparatus and said steam-heater apparatus.

* * * * *